United States Patent [19]

Sugimoto et al.

[11] Patent Number: 5,271,914
[45] Date of Patent: Dec. 21, 1993

[54] PROCESS FOR ADSORBING THE VAPOR OF ALCOHOLIC FUELS

[75] Inventors: Takashi Sugimoto, Toyota; Takashi Kato, Okazaki; Masashi Harada, Shinnanyo; Seiichi Asano, Hikari, all of Japan

[73] Assignee: Tosoh Corporation, Shinnanyo, Japan

[21] Appl. No.: 978,172

[22] Filed: Nov. 17, 1992

Related U.S. Application Data

[60] Continuation of Ser. No. 771,530, Oct. 7, 1991, abandoned, which is a division of Ser. No. 672,129, Mar. 19, 1991, abandoned.

[30] Foreign Application Priority Data

Apr. 4, 1990 [JP] Japan ............................ 2-89558

[51] Int. Cl.$^5$ ............................................. B01D 47/00
[52] U.S. Cl. ....................................................... 95/141
[58] Field of Search ............. 585/820; 55/75; 502/77; 423/213.5, 247, 212, 212 C, 213.7, 245.1

[56] References Cited

U.S. PATENT DOCUMENTS

| | | | |
|---|---|---|---|
| 4,423,280 | 12/1983 | Dessau | 585/820 |
| 4,517,402 | 5/1985 | Dessau | 585/820 |
| 4,705,674 | 11/1987 | Argauer et al. | 423/328 |
| 5,051,244 | 9/1991 | Dunne et al. | 423/213.5 |
| 5,078,979 | 1/1992 | Dunne | 423/213.5 |

FOREIGN PATENT DOCUMENTS

| | | | |
|---|---|---|---|
| 1205980 | 6/1986 | Canada | 423/213.5 |
| 46-10064 | 1/1971 | Japan . | |
| 53-23280 | 2/1978 | Japan . | |
| 59-226263 | 12/1984 | Japan . | |
| 60-50312 | 3/1985 | Japan . | |
| 62-138320 | 6/1987 | Japan . | |
| 62-70225 | 12/1987 | Japan . | |

OTHER PUBLICATIONS

Ma et al. "Adsorption of Hydrocarbons in (Na,K)-ZSM5,-ZSM11 and 'Al-Free' NaZSM5 and NaZSM11" New Developments in Zeolite Science and Technology, Ed. Murakami et al. 1986 Elsevier pp. 2158-2163.

J. Chem. Soc., pp. 2158-2163, 1948, R. M. Barrer, "Syntheses and Reactions or Mordenite".

*Primary Examiner*—R. Bruce Breneman
*Attorney, Agent, or Firm*—Oblon, Spivak, McClelland, Maier & Neustadt

[57] ABSTRACT

A process for adsorbing the vapor of alcoholic fuels comprising using a a zeolite with a Si/Al molar ratio of not less than 10 in the crystal skeleton.

2 Claims, 1 Drawing Sheet

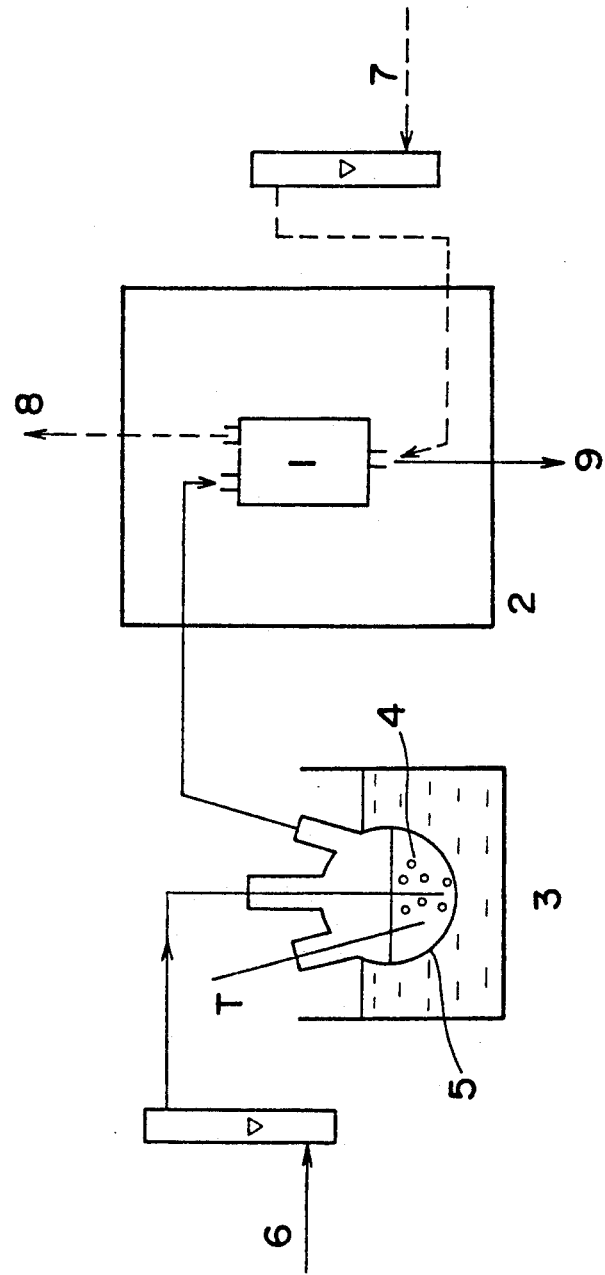

PROCESS FOR ADSORBING THE VAPOR OF ALCOHOLIC FUELS

This application is a continuation of application Ser. No. 07/771,530, filed on Oct. 7, 1991, now abandoned, which is a continuation of Ser. No. 07/672,129, filed on Mar. 19, 1991, now abandoned.

BACKGROUND OF THE INVENTION

The present invention relates to an adsorbent for the vapor of alcoholic fuels usable for canister etc. of vehicles using alcohol as a fuel.

Recently, vehicles driven with fuels mixed alcohols such as methanol and ethanol low in the emission of black smoke and nitrogen oxides with gasoline are attracting an attention.

As the adsorbent for canister of gasoline fuels, pulverized or granulated active carbon is used widely. But, because of low collection efficiency for alcohols, active carbon is unsuitable as an adsorbent for the vapor of alcoholic fuels.

An adsorption device for evaporated fuels provided with two adsorbent layers was proposed in Japanese Unexamined Patent Publication No. Sho 59-226263. Here, the provision of the second adsorbent layer comprising a material adsorbable polar components is described. It teaches that zeolite is also effective as a material suitable for the second adsorbent layer. However, no explanation is made about the type and characteristics of the optimum zeolite for this purpose. Commonly, the general purpose zeolite exhibits a strong adsorptive power up to low concentration region for water and alcohols being polar molecules. For this reason, if contacting this with the vapor of fuels containing polar molecules of moisture or alcohols, the polar molecules are captured intensively by zeolite. In the case of canister, the desorption of evaporated fuels adsorbed onto adsorbent is performed by introducing fresh air to adsorbent bed, that is, the adsorption and desorption are made through the difference in partial pressures. However, the polar molecules once adsorbed intensively onto the general purpose zeolite cannot be desorbed only through the difference in partial pressures at a level of the fresh air having been introduced to adsorbent bed. For this reason, the effective adsorption level is low when used as an adsorbent for vapor of alcohols.

As described, only by simply combining the adsorbents known hitherto, no satisfiable performance can be achieved for the adsorption and desorption of the vapor of alcoholic fuels, and there have been no suitable adsorbents intended for the alcoholic fuels until now.

The invention provides a zeolite-based adsorbent which exhibits an excellent adsorptive performance for the collection of the vapor of fuels containing alcohols.

SUMMARY OF THE INVENTION

The adsorbent for the vapor of alcoholic fuels according to the invention comprises a zeolite with a Si/Al molar ratio of not less than 10 in the crystal skeleton.

BRIEF DESCRIPTION OF THE DRAWING

FIG. 1 is a process drawing of adsorption and desorption test in the example.

DETAILED DESCRIPTION OF THE INVENTION

The basic structure of zeolite crystal consists of respective tetrahedrons of $SiO_4$ and its substituent $AlO_4$, and they mutually share an oxygen atom at the vertex to form a crystal structure developed in three-dimensional direction. Consequently, the crystal of zeolite has very large cavities and pore paths, which cannot be found in other minerals. The entrance diameter of these pores is usually 3 to 9 Å though different depending on zeolites and can capture various molecules inside of pores. Moreover, in the crystal, cations exist to compensate the negative charges of $AlO_4$. Under the influence of electrostatic field formed by these cations, zeolite selectively adsorbs the polar molecules and polarizable molecules. The Si/Al molar ratio of A type zeolite, X type zeolite, Y type zeolite, etc. commonly used as general purpose adsorbents is as low as 1 to 2.5. Alcohols adsorbed onto these zeolites are captured intensively inside of pores of zeolite under the influence of electrostatic field, and they are not eleminated only by decreasing the partial pressure not permitting enough the effective adsorption level. From such reason, the general purpose zeolites with a Si/Al ratio of 1 to 2.5 are unsuitable as adsorbents for the vapor of alcohols.

However, the specific pore structure of crystal of zeolite having pores of 3 to 9 Å is very attractive for the adsorption of low-boiling point components, in particular, for the adsorption of alcohols and lower hydrocarbon components, since the pore diameter of zeolite and the size of adsorbing molecules are roughly same.

The inventors prepared various types of zeolites by direct synthetic method or a method of giving modification. Treatment to synthetic zeolite and investigated diligently to develop the adsorption and desorption characteristics advantageous for the collection of the vapor of alcoholic fuels onto zeolite. As a result, they have found that zeolites with a Si/Al molar ratio of not less than 10 in the crystal skeleton exhibit an excellent adsorption and desorption characteristics for the vapor of alcoholic fuels and are useful for the adsorbents for canister etc.

In the case of the Si/Al molar ratio in zeolite being under 10, the adsorptive power for alcohols is too strong and, though the adsorption is possible, the elimination becomes difficult. Moreover, if the Si/Al molar ratio exceeds 500, the adsorption level for alcohols tends to decrease, thus, preferably, zeolites with a Si/Al molar ratio of 10 to 500 are suitable for the adsorbents for vapor of alcohols.

The adsorption and desorption characteristics for alcohols also vary with the types of zeolites besides the Si/Al ratio. The pores of zeolite capable of adsorbing alcohols and lower hydrocarbons (alcoholic fuels for cars are usually mixtures of gasoline with alcohols) are limited to those formed their entrances by 8, 10 and 12-membered oxygen rings, and zeolites having crystalline structures of chabasite, offretite, mordenite, faujasite, L, Ω, ZSM-5, ZSM-11 type, etc. are suitable for the adsorption for alcohols.

Moreover, the statically saturated adsorption level of zeolite is determined by the void volume of crystal (volume of voids in 1 ml of zeolite crystal). The void volume of zeolites is 0.15 to 0.5 ml/ml and, in particular, zeolites having crystalline structures of faujasite, chabasite, offretite, T, L, Ω, phillipsite, mesolite, mordenite type, etc., the void volume thereof being 0.25 or more, are high also in the saturated adsorption level for alcohols.

Different from zeolites with a Si/Al molar ratio of less than 10, these zeolites with a Si/Al molar ratio of not less than 10 selectively adsorb alcohols and lower hydrocarbons rather than water. Namely, when moisture is adsorbed beforehand onto zeolite with a Si/Al molar ratio of not less than 10 and the adsorption and desorption test of alcohol vapor is repeated, very high effective adsorption levels can be observed at initial several times. When the adsorption and desorption test of alcohol is further repeated, the effective adsorption levels are same as obtained with zeolite in the state not containing moisture. The higher initial effective adsorption level is considered to be a specific phenomenon that occurs because of the replacement of water having been adsorbed beforehand with alcohol and the suppressed temperature rise of adsorbed layer. This specific phenomenon however does not last long and, after the water molecules in the pores of zeolite have been replaced with alcohol, the effective adsorption level becomes normal. As described, even when the adsorbent was exposed to a large amount of moisture, the decrease in the adsorption performance of zeolite with a Si/Al molar ratio of not less than 10 still cannot be recognized.

As the preparative method of zeolite with a Si/Al molar ratio of not less than 10, there is a method of preparing by dealuminum treatment using natural zeolite or synthetic zeolite as a starting raw material, a direct synthetic method of crystallizing a mixture of raw materials from silica source, alumina source and alkali source, a method of synthesizing by further adding organic mineralizer thereto or the like.

As zeolites with a Si/Al molar ratio of not less than 10 prepared by the dealuminum treatment, dealuminum mordenite (N.Y. Chen, J. Phy. Chem., 80, (1), 60–64 (1976)), ultrastabilized Y type zeolite (Japanese Unexamined Patent Publication No. Sho 54-122700; Studies in Surface Science and Catalysis, Volume 5, 203–210 (1980)), ultrastabilized L type zeolite (Japanese Unexamined Patent Publication No. Sho 60-050312), etc. are known.

As zeolites with a Si/Al molar ratio of not less than 10 prepared by the direct synthesis, mordenite (R. M. Barrer, J. Chem, Soc., 1948, 2158), ZSM-5 (Japanese Unexamined Patent Publication No. Sho 46-10064), ZSM-11 (Japanese Unexamined Patent Publication No. Sho 53-23280), etc. are known.

All of these zeolites can be used suitably for the adsorbents for the vapor of alcoholic fuels. Moreover, the Si/Al ratio of Zeolite can be controlled freely through the conditions of modification treatment or the conditions of direct synthesis, thus it is possible to provide an optimum adsorbent for the adsorption and desorption of the vapor of alcoholic fuels.

The optimum Si/Al ratio in crystal skeleton for the adsorption and desorption of alcoholic fuels varys depending on the crystalline structure of zeolite. While, in the case of faujasite type zeolite, the optimum Si/Al molar ratio for the adsorption and desorption of methanol and ethanol can be found within a range of 20 to 100, in the case of mordenite type zeolite, the optimum Si/Al molar ratio is found within a range of 50 to 200, and further, in the case of ZSM-5, it is found within a range of 100 to 500. In the case of faujasite type zeolite, the entrance diameter of pores is 8 Å, but the size of voids in crystal is about 13 Å. On the other hand, in the cases of mordenite and ZSM-5, the entrance diameter of pores and the size of voids in crystal are equal, which are 7 Å and 6 Å, respectively. In this way, the adsorption and desorption characteristics of alcohol are determined by the balance between void diameter of zeolite crystal and polarity of zeolite skeleton. Namely, when the void diameter of zeolite equals approximately to the size of alcohol molecule, alcohol can be enough captured, even if the crystal skeleton may have little polarity, and yet the adsorbed alcohol can be easily eliminated even by the difference in partial pressures. However, when the void diameter is two or more times as large as the sizes of methanol molecule and ethanol molecule as the case of faujasite, the adsorptive power for alcohols becomes low, unless some extent of polarity is given to the zeolite crystal itself. In this case, however, if the Si/Al ratio is established too low, the elimination of adsorbed alcohols would become difficult resulting in a low effective adsorption level.

Moreover, when zeolite with a void diameter of 13 Å is compared with that with less than 7 Å, the latter shows higher rate of effective adsorption level to statically saturated adsorption level than the former. This fact is presumably due to that the adsorption characteristics for methanol changed abruptly in front and behind of the void diameter of 7 Å. Namely, with zeolites with a void diameter of more than 8 Å, the adsorptive power for methanol and ethanol is weakened and the adsorption zone in the adsorbent bed becomes deep, thus the effective adsorption level becomes relatively lower over zeolites with a void diameter of less than 7 Å.

Zeolite contains exchangeable cations. When capturing the vapor of alcoholic fuels, cations of alkali metals or alkaline earth metals in zeolite are unpreferable, since they affect on the pore diameter and the electrostatic field in pores. With hydrogen ion type, therefore, the adsorption performance is stable and preferable.

When using the inventive adsorbents for canister, the smaller the space required for the installation, the better the canister, since it is used as parts of cars. Hence, the higher packing density of zeolite adsorbent is more preferable. In practice, the packing density of not less than 0.5 g/ml is preferable.

For making the zeolite powder pellet- or bead-like, clay minerals such as kaolinite and montmorillonite and inorganic binders of alumina type and silica type are generally used preferablly. Moreover, the incorporation of small amount of ceramic fibers such as glass fibers is particularly effective for the purposes of increased strength of molded product and prevention from dusting.

However, in the case of molded product of zeolite added with binder to zeolite powder, the zeolite effective for the adsorption and desorption of alcoholic fuels is diluted by clay or binders such as alumina and silica. In the case of adsorbent for canister, the higher the effective adsorption level, the better. By the way, molded products of zeolite produced without using binder are shown in Japanese Unexamined Patent Publication No. Sho 62-70225, No. Sho 62-138320, etc. Such adsorbent prepared using the molded product of zeolite not containing binder component as a starting raw material has a high effective adsorption level and exhibits particularly excellent adsorption and desorption performance as an adsorbent for canister of alcoholic fuels.

As described above, the invention provides a zeolite with a Si/Al molar ratio of not less than 10 as an adsorbent for collecting the vapor generating from alcoholic fuels. In accordance with the invention, the collection of the vapor of alcoholic fuels, which has been difficult hitherto with active carbon, has become possible without special contrivance for the structure of canister etc.

In following, the examples of the invention will be illustrated.

EXAMPLE 1 THROUGH 6

In Table 1, the zeolite-based adsorbents of the invention are shown. In the cases of zeolite-based adsorbents of Example 1 through 5, 25 parts by weight of clay-based inorganic binder were added to 100 parts by weight of each zeolite and the mixture was molded by the use of extruding granulator, which was then calcined for 2 hours at 600° C. to obtain a cylindrical adsorbent with a diameter of 1.5 mm. Moreover, in the case of zeolite-based adsorbent of Example 6, binderless type granular zeolite was used as a starting raw material for the preparation. The adsorption and desorption test of these adsorbents for the vapor of alcohol was performed by following method.

Testing Method of Adsorption and Desorption

The adsorption and desorption test was performed using a testing apparatus shown in FIG. 1. Each adsorbent of Example 1 through 6 is packed into a cylindrical canister (1) with an inner volume of 250 ml, which is set in a thermostatic oven (2). In a vapor generator (3), metanol (4) is charged into a round bottom flask (5), heated and kept at 60° C. Air (bubbling air 6) is passed through alcohol (4) at a rate of 1000 ml/min and the generated vapor of methanol (4) is introduced to the canister (1). At a point of time when the amount of methanol discharged from canister (1) reached 1 g, the aeration is stopped and the weight of canister is measured. Next, 120 liters of air (purging air 7) is passed through the canister (1) to perform the elimination of alcohol and the weight of canister (1) is measured again. In FIGS. 8 and 9 illustrate purged exhaust gas and leak trap respectively.

The weight of canister (1) after elimination was subtracted from the weight of canister (1) after adsorption of methanol to obtain the effective adsorption level for methanol per 100 g of adsorbent. This procedure was repeated four times and the average value of second to fourth times is shown in Table 1.

COMPARATIVE EXAMPLE 1 AND 2

In Comparative example 1 and 2, 1.5 mm$\phi$ granular articles of general purpose A and X type zeolites were used, respectively, as the adsorbents and the same adsorption and desorption test of methanol as in examples was performed. Results are shown in Table 2.

In Table 1 and Table 2, the nomenclature of the structure of zeolite, Si/Al ratio and apparent specific gravity (g/ml) are put down together.

TABLE 1

|  | Name of zeolite | Si/Al molar ratio | Apparent specific gravity (g/ml) | Effective adsorption level (g/100 g) |
|---|---|---|---|---|
| Example 1 | Faujasite | 50 | 0.43 | 7.4 |
| Example 2 | Faujasite | 72 | 0.42 | 7.4 |
| Example 3 | Faujasite | 355 | 0.54 | 6.7 |
| Example 4 | ZSM-5 | 20 | 0.55 | 6.1 |
| Example 5 | Mordenite | 55 | 0.44 | 7.0 |
| Example 6 | Mordenite | 55 | 0.65 | 8.9 |

TABLE 2

|  | Name of zeolite | Si/Al molar ratio | Apparent specific gravity (g/ml) | Effective adsorption level (g/100 g) |
|---|---|---|---|---|
| Comparative example 1 | A | 1 | 0.75 | 2.7 |
| Comparative example 2 | Faujasite | 1.25 | 0.75 | 2.5 |

What is claimed is:

1. A method of reversibly absorbing the vapor of alcoholic fuels from evaporative emissions which comprises contacting said emissions with a zeolite having a Si/Al molar ratio of at least 10 in the crystal skeleton, thereby depleting the alcohol vapor concentration within said emission, and desorbing said gaseous alcohol from said zeolite, wherein desorption is effected by reduction of the partial pressure of said alcohol vapor by air.

2. The method of claim 1 wherein said zeolite is contained within a canister.

* * * * *

UNITED STATES PATENT AND TRADEMARK OFFICE
CERTIFICATE OF CORRECTION

PATENT NO. : 5,271,914
DATED : December 21, 1993
INVENTOR(S) : Takashi SUGIMOTO et al It is certified that error appears in the above-indentified patent and that said Letters Patent is hereby corrected as shown below:

In Column 5, line 41, change "In FIGS. 8 and 9" to

--In FIG. 1, elements 8 and 9--.

Signed and Sealed this

Twenty-eight Day of February, 1995

Attest:

BRUCE LEHMAN

Attesting Officer

Commissioner of Patents and Trademarks